United States Patent
Waner

Patent Number: 5,745,951
Date of Patent: May 5, 1998

[54] DIRECTIONAL CONTROL CASTER ASSEMBLY

[75] Inventor: John Waner, Redmond, Wash.

[73] Assignee: Interstore Transfer Systems, Ltd., Redmond, Wash.

[21] Appl. No.: 606,420

[22] Filed: Feb. 23, 1996

[51] Int. Cl.$^6$ ..................................................... B60B 33/00
[52] U.S. Cl. ........................................... 16/31 R; 16/35 R
[58] Field of Search ................................. 16/31 R, 35 R, 16/37, 38, 24

[56] References Cited

U.S. PATENT DOCUMENTS

| | | | |
|---|---|---|---|
| 803,645 | 11/1905 | Upton. | |
| 1,489,544 | 4/1924 | Parkinson. | |
| 1,635,389 | 7/1927 | Shuffleton. | |
| 1,752,742 | 4/1930 | Johnson. | |
| 2,434,863 | 1/1948 | Parkhill | 16/35 |
| 2,520,375 | 8/1950 | Roe | 16/39 |
| 3,277,513 | 10/1966 | Schultz | 16/31 R |
| 3,478,381 | 11/1969 | Schultz | 16/31 R |
| 3,828,392 | 8/1974 | Bolger | 16/35 R |
| 3,858,270 | 1/1975 | Crowe | 16/19 |
| 3,881,216 | 5/1975 | Fontana | 16/35 R |
| 3,911,525 | 10/1975 | Haussels | 16/35 R |
| 3,974,542 | 8/1976 | Timmer et al. | 16/35 R |
| 4,985,960 | 1/1991 | Zun | 16/35 R |
| 5,119,525 | 6/1992 | Melara | 16/31 R |
| 5,199,131 | 4/1993 | Harris | 16/31 R |
| 5,331,717 | 7/1994 | Joslin et al. | 16/35 R |
| 5,457,849 | 10/1995 | Branson et al. | 16/19 |

Primary Examiner—Chuck Mah
Assistant Examiner—Mark Williams
Attorney, Agent, or Firm—Seed and Berry LLP

[57] ABSTRACT

A caster assembly mountable to a frame leg of a movable frame structure having a caster receiving aperture therein. The caster assembly of a preferred embodiment includes a caster having a caster fork, a caster wheel attached to the caster fork, and a mounting shaft attached to a caster fork. The mounting shaft is shaped and sized to extend through the aperture in the frame portion when the caster assembly is in an installed position wherein the caster is adjacent to a bottom side of the frame leg and an intermediate portion of the mounting shaft is adjacent to a top side of the frame leg. The mounting shaft has an generally flat blocking surface extending along a portion of the shaft such that the blocking surface is adjacent to the aperture in the frame leg when the caster is in the installed position. A locking washer is removably connected to the mounting shaft and is mountable to the frame leg. The locking washer has a shaft aperture that receives the mounting shaft therein, and an engagement portion defines a portion of the shaft aperture. The blocking surface is removably positioned immediately adjacent to the engagement portion so as to engage the engagement portion and prevent rotational movement of the mounting shaft relative to the locking washer and relative to the frame leg when the caster is in the installed position. The locking washer retains the mounting shaft in a selected angular orientation relative to the frame leg aligned with a primary intended direction of travel, thereby providing directional control of the frame structure.

20 Claims, 4 Drawing Sheets

5,745,951

DIRECTIONAL CONTROL CASTER ASSEMBLY

TECHNICAL FIELD

The present invention is directed toward casters, and more particularly, caster assemblies mountable to a movable frame structure to provide directional control during movement of the frame structure.

BACKGROUND OF THE INVENTION

Conventional caster assemblies are typically mounted to carts, racks, and other frame structures, so the frame structures can be easily transported from one location to another by rolling on the caster assemblies. As an example, an inventory garment rack used in department stores includes four or six casters on the bottom of the rack such that the garment rack can be easily wheeled between an inventory storage area and a sales floor in the department store. The caster assemblies are swivel casters, which are rotatable relative to the frame structure, or fixed casters that are not rotatable relative to the frame structure.

The fixed caster assemblies are secured to the frame structure with a selected alignment and angular orientation relative to the frame structure. If the fixed caster assemblies are not mounted properly with careful alignment in an intended primary direction of travel, the caster assemblies, and thus the frame structure, will not track in the intended primary direction of travel without drifting laterally or rotating. Such lateral or rotational motion makes steering and controlling the frame structure difficult. As a result, the fixed caster assemblies must be carefully and accurately mounted to the frame structure to ensure proper alignment so the caster assemblies and frame structure will track in the desired primary direction of travel without drifting. Such careful mounting of the four or more caster assemblies for each garment rack, inventory cart, or other frame structure is a very time consuming and laborious process.

Swivel caster assemblies, such as those in U.S. Pat. Nos. 3,828,392; 3,818,216; 3,911,525; 3,974,542; and 5,331,717 are often lockable so the casters in one of a plurality of positions relative to the frame structure are free to swivel when unlocked, and releasably fixed in one of a plurality of positions relative to the frame structure when locked. However, the angular orientation of the caster relative to the frame structure when the caster assembly is locked is dependent upon the orientation of the caster assembly when it is mounted to the frame structure. If the caster assembly is not mounted at the correct angular orientation, then the caster will lock in an angled position that does not allow the frame structure to track in the intended direction of travel without drifting laterally or rotating. A further drawback of the conventional, lockable swivel casters is that they have a tendency to become misaligned over time. Accordingly, the swivel caster assemblies, and particularly, mounting structures of the swivel caster assemblies, must be carefully mounted to the frame structure and periodically re-aligned to avoid lateral drifting or rotation of the frame structure when the casters are locked and the frame structure is being rolled on the caster assemblies. Such careful mounting of the mounting structure is a time consuming and laborious process.

SUMMARY OF THE INVENTION

The present invention is directed toward a directional control caster assembly that overcomes the deficiencies experienced by the conventional caster assemblies. In one embodiment of the present invention, the directional control caster assembly is mountable to a movable frame with a frame portion that has a receiving aperture therein. The caster assembly includes a caster with a caster support, a caster wheel rotatably attached to the caster support, and a mounting shaft attached to the caster support and extending away from the caster support and the caster wheel. The mounting shaft is shaped and sized to extend through the receiving aperture in the frame portion when the caster is installed. The mounting shaft has a generally flat blocking surface extending along a portion of the shaft such that the blocking surface is adjacent to the upper side of the frame portion when the caster is in the installed position.

A locking washer is removably connected to the mounting shaft such that the mounting shaft extends through a shaft aperture in the locking washer. The locking washer has a generally flat engagement portion defining a portion of the shaft aperture, and the engagement portion is immediately adjacent to the blocking surface of the mounting shaft. The engagement portion engages the blocking surface when the caster is in the installed position, and the blocking surface prevents the mounting shaft from rotating relative to the frame portion to provide directional stability of the caster wheel relative to the frame during movement of the frame. A projection engages the locking washer and the frame portion to prevent relative movement of the locking washer relative to the frame portion and to provide the directional stability of the caster relative to the frame.

In one alternate embodiment of the present invention, the mounting shaft has an elongated keyway therein that extends along a section of the mounting shaft such that a portion of the keyway is adjacent to the aperture in the frame portion when the caster is in the installed position. The generally flat blocking surface defines a portion of the keyway. The locking washer has a key member protruding into the shaft aperture, and the key member is removably positioned in the keyway in the mounting shaft. The engagement portion defines a portion of the key member, and the key member extends into the keyway and prevents the mounting shaft from rotating relative to the frame portion.

The alternate embodiment of the directional control caster assembly includes a swivel caster having a caster fork and a rotation member attached to the caster fork, with the mounting shaft being connected to the rotation member. The caster fork and rotation member are rotatable relative to the frame portion. A locking mechanism is attached to the rotation member and is releasably coupled to the caster fork for releasably locking the caster fork in a selected position relative to the rotation member so as to selectively restrict rotation of the caster fork relative to the rotation member. The mounting shaft is connected to the rotation member such that the caster wheel and caster fork are rotatable relative to the mounting shaft when the swivel caster is unlocked. While the swivel caster is unlocked and rotatable, the shaft remains locked by the locking washer and is prevented from rotation relative to the frame portion.

3

Figure 3:
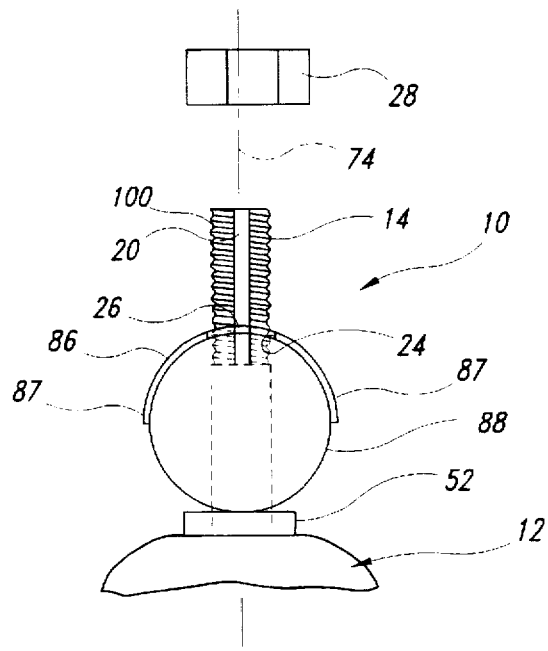

FIG. 3 is a front elevation view of a first alternate embodiment of a caster assembly having an arcuate locking washer positioned on a tubular frame leg, with the caster wheel and caster forks not shown.

Figure 4:
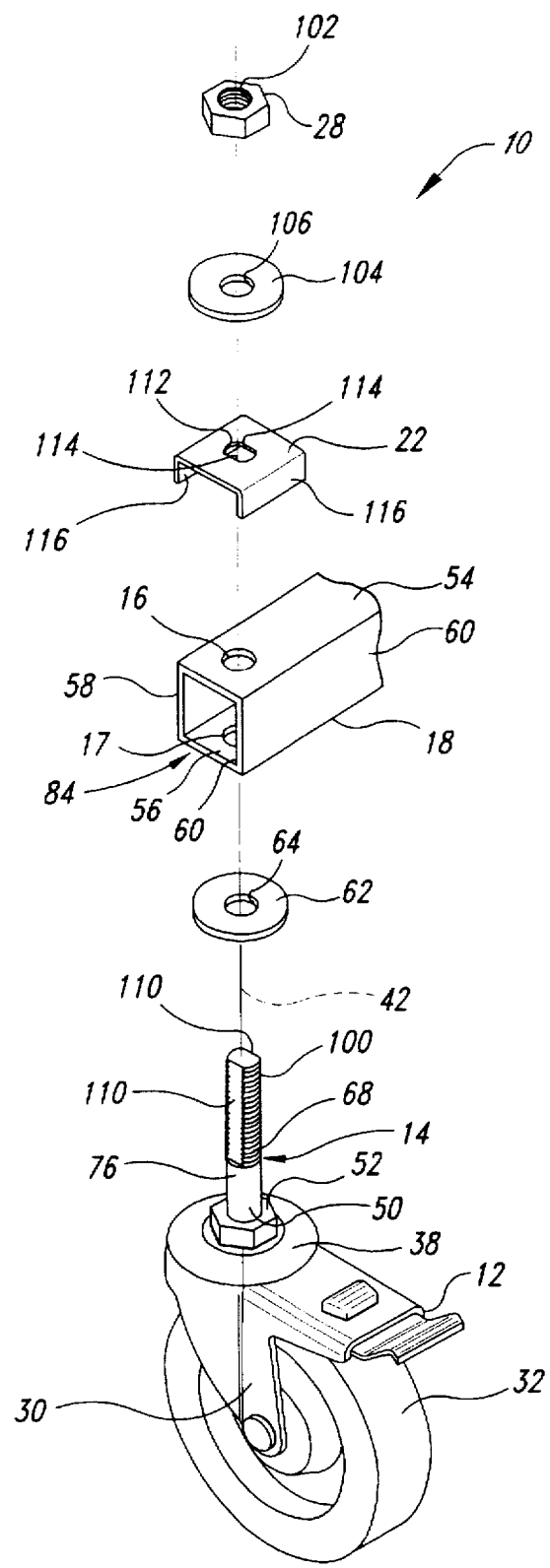

FIG. 4 is an exploded top isometric view of a second alternate embodiment of the present invention, with a frame leg portion of a frame structure partially shown.

Figure 5:
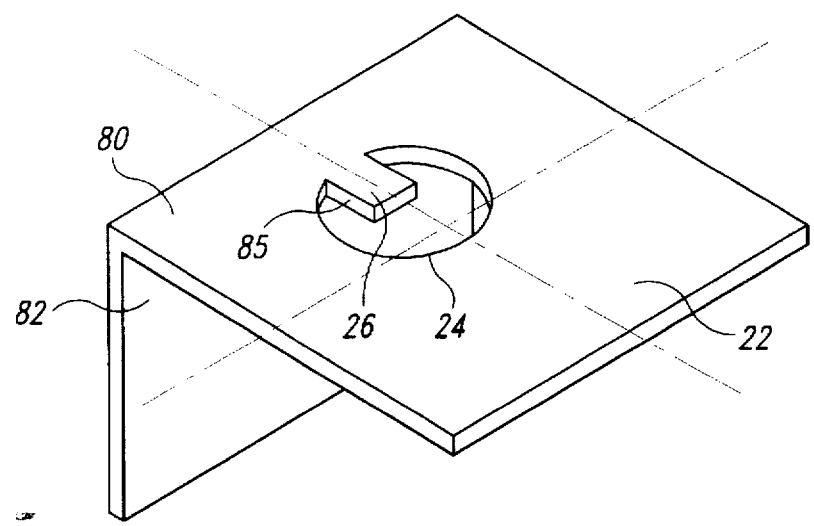

FIG. 5 is an isometric view of a locking washer with a shaft aperture being shown offset from the locking washer's center area.

DETAILED DESCRIPTION OF THE INVENTION

A directional control caster assembly 10 in accordance with the present invention is shown in the drawings for purposes of illustration. The caster assembly 10 of one embodiment of the present invention includes a lockable swivel caster 12 with a mounting shaft 14 securely attached to the swivel caster. The mounting shaft 14 is a generally cylindrical shaft shaped in size to extend through coaxially aligned upper and lower apertures 16 and 17, respectively, in a frame leg 18 of a frame structure, such as an inventory moving cart, hanging rack, or the like. The mounting shaft 14 has an elongated keyway 20 that extends along a portion of the mounting shaft, and the keyway removably receives a key member 26 on a locking washer 22. The locking washer 22 is shaped and sized to engage the frame leg 18 so a shaft aperture 24 in the locking washer is substantially coaxially aligned with the upper and lower apertures 16 and 17. The key member 26 on the locking washer 22 protrudes is into the shaft aperture 24 such that the key member extends into the keyway 20 and engages the mounting shaft 14.

When the caster assembly 10 is in an installed position on the frame leg 18, the swivel caster 12 is below the frame leg, and the mounting shaft 14 extends through the upper and lower apertures 16 and 17 in the frame leg and through the shaft aperture 24 in the locking washer 22. The key member 26 fits into the keyway 20 and locks the mounting shaft 14 in a selected orientation relative to the frame leg 18 and the key member prevents the mounting shaft from rotating relative to the frame leg. A fastener 28 is removably attached to the mounting shaft 14 when the caster assembly 10 is in the installed position such that the fastener sandwiches the locking washer 22 between it and the frame leg 18. The fastener 28 also prevents axial movement of the mounting shaft when the caster assembly 10 is in the installed position with the fastener in a tightened and secured position.

Accordingly, the orientation of the mounting shaft 14 relative to the frame leg 18 is fixed by the locking washer 22. When the swivel caster 12 is in a conventional free and unlocked position, the swivel caster freely swivels or rotates relative to the mounting shaft and frame leg 18, for example, when the hanging rack or other moving frame structure is rolled on the caster assemblies. When the swivel caster 12 is in a locked position, the swivel caster is prevented from swiveling relative to the mounting shaft 14 and is securely held in a predetermined position so the frame structure will track in an intended direction without drifting laterally or rotating. Therefore, when the swivel caster 12 is locked in the selected position, the caster assembly 10 provides directional control of the frame structure while the frame structure, as an example, is rolled from an inventory storage room to a retail floor space in a department store or the like.

In a preferred embodiment, the mounting shaft 14, the locking washer 22, and the swivel caster 12 are secured to the frame leg 18 such that when the swivel caster 12 is in a locked configuration, the swivel caster is aligned either parallel with a longitudinal axis of the frame structure, or perpendicular to the longitudinal axis such that the frame structure will track in the primary direction of travel.

Figure 1:
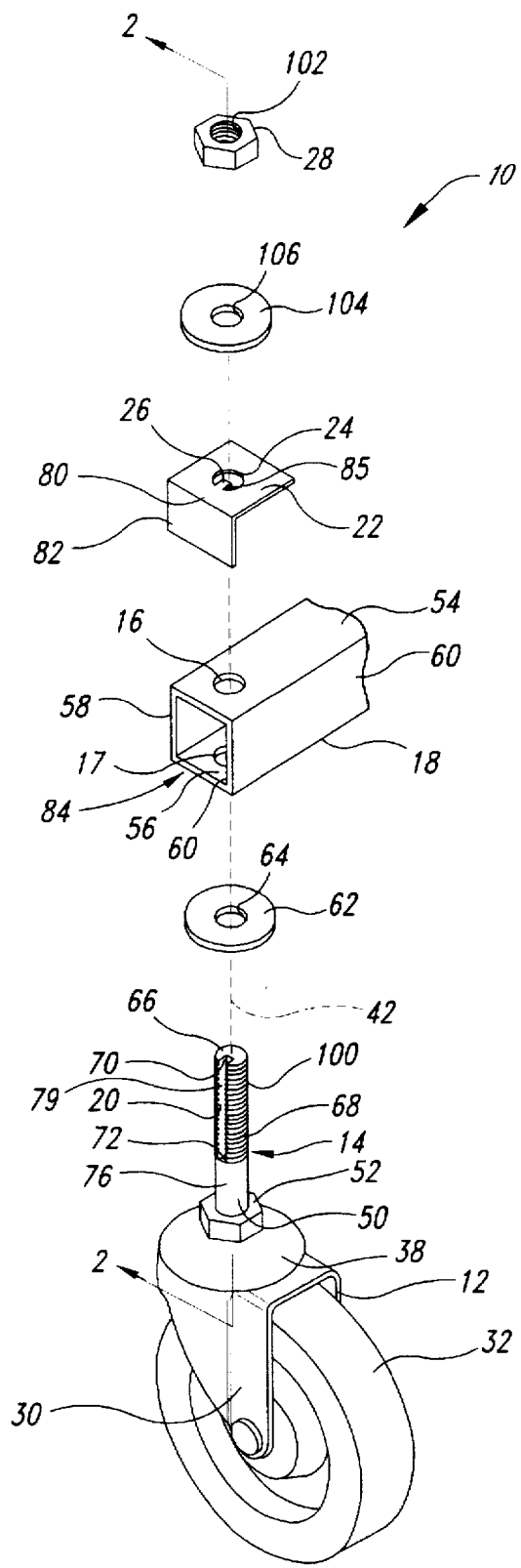
FIG. 1 is an exploded top isometric view of one embodiment of the directional control caster assembly of the present invention, with a frame leg portion of a frame structure partially shown.
Figure 2:
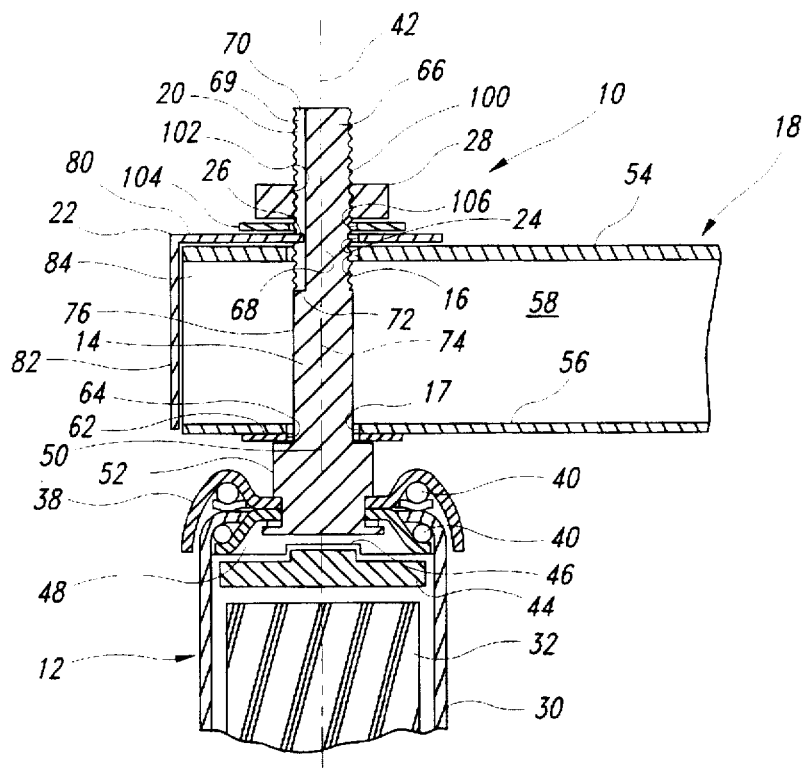
FIG. 2 is an enlarged cross-sectional view taken substantially along lines 2—2 of FIG. 1, with the caster wheel and lower portions of a caster fork not illustrated.

As best seen in FIGS. 1 and 2, the swivel caster 12 of the illustrated embodiment is a conventional, lockable swivel caster having a caster support in the form of caster forks 30 that rotatably carry a caster wheel 32. A bearing housing 38 is attached to an upper portion 40 of the caster forks 30, and the bearing housing 38 includes bearings 40 (FIG. 2) that are coupled to the caster forks 30. The bearings 40 allow the caster forks 30 to rotate relative to the bearing housing 38 and the mounting shaft 14 about a swivel axis 42, which coincides with the longitudinal axis of -the mounting shaft. In an alternate embodiment (not shown), the swivel caster 12 swivels about a swivel axis that is offset from the longitudinal axis of the mounting shaft 14.

The swivel caster 12 includes a conventional locking mechanism 44 that is attached to the bearing housing 38 and is releasably coupled to the caster fork 30 for releasably locking the caster fork in a selected position relative to the bearing housing when the locking mechanism is in the locked position. The locking mechanism 44 is movable between an unlocked position wherein the caster forks 30 and caster wheel 32 can freely swivel about the swivel axis 42, and a locked position wherein the locking mechanism 44 extends into a locking notch 46 engages a locking portion 48 of the caster forks, thereby preventing rotation of the caster forks and caster wheel about the swivel axis. In the preferred embodiment, the swivel caster 12 is lockable at four different locked angular positions relative to the mounting shaft 14, with four locking positions spaced equidistant on the shaft circumference. Accordingly, the caster forks 30 and caster wheel 32 are lockable relative to the mounting shaft 14 and the frame leg at 0°, 90°, 1800° and 270° with respect to a 360° range of motion of the swivel caster about the swivel axis 42.

As best seen in FIG. 1, the frame leg 18 of the illustrated embodiment is a tubular member having a generally square cross-sectional shape defined by a top wall 54, a bottom wall 56 opposite the top wall, and left and right sidewalls 58 and 60 extending between the top and bottom walls. The top aperture 16 extends through the top wall 54 and the bottom aperture 17 extends through the bottom wall 56 such that the top and bottom apertures are coaxially aligned along an aperture axis. The frame leg 18 of the illustrated embodiment is a generally horizontal member having a longitudinal axis that is perpendicular to the aperture axis.

The mounting shaft 14 has a lower portion 50 that is securely fastened with a fastener 52 to the bearing housing 38 such that the bearing housing is fixed and non-rotatable relative to the mounting shaft. The fastener 52 at the lower portion of the mounting shaft 14 is adjacent to the bottom wall 56 of the frame leg 18 when the caster assembly is in the installed position. The mounting shaft 14 is generally perpendicular to the bearing housing 38 and extends upwardly away from the bearing housing and the caster fork 30. The lower portion 50 of the mounting shaft 14 extends upwardly through the lower aperture 17. A bottom washer 62 is sandwiched between the bottom wall 56 of the frame leg 18 and the fastener 52 at the lower portion 50 of the mounting shaft 14. The lower portion 50 of the mounting shaft 14 extends through a washer aperture 64 in the bottom washer 62 such that the fastener 52 firmly engages the bottom washer, and the bottom washer distributes compressive loads from the fastener over a larger area of the frame leg's bottom wall 56.

The mounting shaft 14 extends upwardly through the frame leg 18 and a top portion 66 of the mounting shaft is positioned above the frame leg's top wall 54. An intermediate portion 68 of the mounting shaft 14 between the upper lower portions 66 and 50 is positioned adjacent to the frame leg's top wall 54 and extends through the upper aperture 16.

As best seen in FIG. 2, the mounting shaft 14 has an outer surface 76 radially disposed about a longitudinal shaft axis 74. The elongated keyway 20 extends radially inwardly from the outer surface 76 toward the longitudinal shaft axis 74. The keyway 20 extends along a portion of the mounting shaft's length, and the keyway is generally parallel with the longitudinal axis of the mounting shaft 14. An upper end 70 of the keyway 20 is at the upper portion 66 of the mounting shaft 14, and a bottom end 72 of the keyway is at the intermediate portion 68 of the mounting shaft. When the caster assembly is in the installed position, the bottom end 72 of the keyway 20 is between the top and bottom walls 54 and 56 of the frame leg 18, such that the keyway extends downwardly through the upper aperture 16.

The keyway 20 extends radially inwardly from the outer surface of the mounting shaft 14 a selected distance so as to provide a keyway of a desired depth. In the embodiment illustrated in FIG. 2, the keyway 20 has a generally square cross-sectional shape defined by three interconnected sidewalls 79, and at least one of the sidewalls provides a generally flat blocking surface that is adapted to engage the key member 22, and prevents the mounting shaft from rotating relative to the frame leg 18. The keyway 20 is oriented such that it is facing the outer end of the frame leg 18, and the locking washer 22 securely retains the mounting shaft in such alignment. In an alternate embodiment, the keyway 20 and mounting shaft 14 are oriented with the keyway 20 facing away, or at other selected orientations, so as to provide a desired positioning of the mounting shaft with respect to the frame leg 18 and to provide the directional stability of the caster assembly 10 and the frame structure.

As best seen in FIGS. 1 and 2, the locking washer 22 is a generally planar member having an edge 80 that is integrally attached to a positioning tab 82 protruding away from the locking washer. The locking washer 22 and the positioning tab 82 are generally perpendicular and define an L-shaped member that is mountable on the frame leg 18 so the locking washer extends across with the top wall 54. The locking washer 22 has a width that is substantially the same as the width of the top wall 54 so edge portions of the locking washer are positioned above the left and right sidewalls 58 and 60. As a result, the locking washer 22 distributes compressive forces across the top wall 54 and to the left and right sidewalls 58 and 60. Such a configuration allows the caster assembly 10 to be securely fastened to the frame leg 18 while minimizing the risk of deforming the top wall 54 and causing it to bend downwardly toward the bottom wall 16 in the event the fastener 28 is over tightened on the mounting shaft 14.

The positioning tab 82 is a generally planar member that extends across the front end 84 of a frame leg 18 and engages the left and right sidewalls 58 and 60. The positioning tab 82 prevents the locking washer 22 from rotating relative to the frame leg 18, and thereby retains the key member in the same position relative to the frame leg 18. Therefore, the locking washer 22 is secured to the frame leg 18 so the locking washer prevents the mounting shaft 14 from loosening or migrating and becoming misaligned during use of the caster assembly 10 over time. In an alternate embodiment, the positioning tab 82 is attached to a selected side of the locking washer 22, and the positioning tab engages either the left wall 58 or the right wall 60 of the frame leg 18, rather than being positioned across the forward end of the frame leg and engaging both walls.

As indicated above, the locking washer 22 is mounted to the frame leg 18 with the locking washer's shaft aperture 24 coaxially aligned with the upper and lower apertures 16 and 17, and the mounting shaft 14 extends through the upper and lower apertures and through the shaft aperture. In the one embodiment as shown in FIG. 5, the locking washer 24 has a central axis that extends through a center area of the locking washer, and the shaft aperture 24 is offset from the locking washer's center area. Accordingly, an aperture axis extending through the shaft aperture 24 is spaced away from the central axis of the locking washer.

The offset shaft aperture 24 facilitates correct and aligned installation of the locking washer 22 onto the frame leg 18, because the shaft aperture will is coaxially align with the upper and lower apertures 16 and 17 in the frame leg only when the locking washer is in a particular orientation relative to the frame leg such that the key member 26 is located in a predetermined position.

The key member 26 is a generally square tab that extends radially inwardly a selected distance into the shaft aperture 24. The key member 26 is defined by three interconnected sidewalls 85. The key member 26 is removably positioned in the keyway 20 in the mounting shaft 14 when the caster assembly 10 is in the installed position such that each of the sidewalls 85 of the key member are immediately adjacent to a respective one of the sidewalls 79 of the keyway 20. At least one of the sidewalls 85 of the key member 26 provides an engagement portion that engages the blocking surface provided by the sidewall 79 of the keyway 20, and prevents rotation of the mounting shaft 14 relative to the frame leg 18. The keyway 20 is shaped and sized to have a generally square cross-sectional shape with a size that is slightly larger than the key member 26 so as to accurately align the mounting shaft 14 in the desired or angular orientation with respect to the frame leg 18, and to restrict the mounting shaft 14 from rotating about its longitudinal shaft axis 74.

In the embodiment illustrated in FIG. 2, the key member 26 extends radially inwardly into the shaft aperture 24 from a side of the aperture nearest the positioning tab 82. In an alternate embodiment, the key member 26 is oriented such that it extends radially inwardly from a side of the shaft aperture 24 farthest from the positioning tab 82. In yet another embodiment, the key member 26 extends radially inwardly from a side of the shaft aperture 24 that is 90° from the side of the aperture closest to the positioning tab 82. Accordingly, the locking washer can be manufactured with the key member 26 positioned at a selected orientation relative to the shaft aperture so as to retain the mounting shaft in a predetermined, angularly fixed position relative to the frame leg 18.

As best seen in FIG. 3, an alternate embodiment of the present invention includes an arcuate locking washer 86 that is integrally connected to curved side portions 87 that protrude away from the locking washer to form a unitary member having a semi-cylindrical cross-sectional shape. The locking washer is shaped and sized to be secured to a cylindrically tubular frame leg 88, such that the semi-cylindrical locking washer extends over the top of the frame leg with the shaft aperture 24 in the locking washer being coaxially aligned with the upper and lower apertures 16 and 17 in the cylindrically tubular frame leg. The curved side portions 87 engage the frame leg 88 and prevent the locking washer 86 from rotating relative to the frame leg.

Referring again to FIGS. 1 and 2, the mounting shaft 14 is a threaded member having external threads 100 extending between the mounting shaft's upper portion 66 and the intermediate portion 68. The external threads are shaped and sized to engage internal threads 102 of the fastener 28. The fastener 28, such as a nut or the like, threadably and removably engages the mounting shaft 14 and can be screwed downwardly along the external threads 100 of the mounting shaft so as to securely retain the mounting shaft 14 and the swivel caster 12 on the frame leg 18.

In the illustrated embodiment, a top washer 104 having a shaft aperture 106 therein is sandwiched between the fastener 28 and the locking washer 22. The shaft aperture 106 in the top washer 104 is coaxially aligned with the shaft aperture 24 in the locking washer 22, and is coaxially aligned with the washer aperture 64 in the bottom washer 62. The top washer 104 distributes compressive loads from the fastener 28 over the locking washer 22. The locking washer 22, in turn, distributes the compressive forces over the top wall 54 of the frame leg 18 to the sidewalls 58 and 60 for structural rigidity and support.

When the caster assembly 10 is releasably secured to the frame leg 18, the mounting shaft 14 is prevented from rotating about its longitudinal axis 74 relative to the frame leg while the unlocked swivel caster 12 can freely swivel. However, when the swivel caster 12 is in a locked position, the caster wheel 32 and caster forks 30 are aligned in a predetermined angular orientation relative to the frame leg 18 so as to align the swivel caster for a primary direction of travel. As a result, the swivel caster 12 will roll in the primary direction of travel and the frame structure, such as an inventory cart or hanging rack, will not drift laterally or rotate while being rolled on the caster wheels 32. The mounting shaft 14 is locked in place by the locking washer 22, so it will not angularly migrate over time, which could lead to misalignment of the swivel caster 12 when in the locked position.

In an alternate embodiment illustrated in FIG. 4, the mounting shaft 14 has a pair of opposing elongated, generally flat blocking surfaces 110 that are generally parallel to the longitudinal axis of the mounting shaft. In the illustrated embodiment, the blocking surfaces 110 are formed by machining opposite sides of the threaded portion of the mounting shaft 14 until the opposing sides are flat and generally parallel. The locking washer 22 in this alternate embodiment has a shaft aperture 112 that corresponds to the cross-sectional shape of the upper portion of the mounting shaft. The shaft aperture 112 is an elongated aperture with generally straight, opposing sidewalls 114 that are positioned to engage the blocking surfaces 110 on the mounting shaft 14 when the caster assembly is in the installed position. The sidewalls 114 define an engagement portion that engages the blocking surface 110 of the mounting shaft 14 and prevents the mounting shaft from rotating relative to the locking washer 22.

The locking washer 22 in this alternate embodiment is attached at opposite sides to a pair of generally parallel positioning tabs 116 that extend downwardly from the locking washer. The locking washer 22 and the positioning tabs 116 are integrally connected to define an inverted U-shaped member that is sized to fit over the top portion of the frame leg 18. The positioning tabs 116 are spaced apart a selected distance that is slightly greater than the width of the frame leg 18, such that each of the positioning tabs is immediately adjacent to a respective one of the left and right sidewalls 58 and 60 of the frame leg 18. Accordingly, positioning tabs engage the frame leg and prevent the locking washer 22 from rotating relative to the frame leg.

The shaft aperture 112 in the illustrated embodiment is oriented so the sidewalls 114 are generally perpendicular to the positioning tabs 116 to retain the mounting shaft in a selected orientation relative to the frame leg 18. In another alternate embodiment, the sidewalls 114 are generally parallel to the positioning tabs 116, so as to securely position the mounting shaft 14 in an alternate orientation relative to the frame leg 18.

The mounting shaft 14 of the alternate embodiment removably receives the fastener 28, the top washer 104, and the bottom washer 62 as discussed above to securely attach the mounting shaft and the caster 12 to the frame leg 18, with the caster being retained in an aligned position relative to the frame leg to provide directional stability when the frame structure is rolled on the caster assembly 10.

While various embodiments of the directional control caster assembly in accordance with the present invention have been described herein for illustrative purposes, the claims are not limited to the embodiment described herein. Equivalent devices may be substituted for those described, which operate according to the principles of the present invention, and thus are within the scope of the following claims. Therefore, it is expressly to be understood that modifications and variations made to the directional control caster assembly of the present invention may be practiced while remaining within the spirit and scope of the invention as defined in the following claims.

I claim:

1. A directional control caster assembly mountable to a mobile frame of the type having a portion with opposing upper and lower sides with a caster shaft aperture therethrough, comprising:

a caster having a caster support, a caster wheel attached to the caster support, and a mounting shaft attached to the caster support and extending away from the caster support and the caster wheel, the mounting shaft being shaped and sized to extend through the aperture in the frame portion when the caster is installed with the caster support being adjacent to the lower side of the frame portion and an intermediate portion of the mounting shaft being adjacent to the upper side of the frame portion, the mounting shaft having a generally flat blocking surface extending along a portion of the shaft such that the blocking surface is adjacent to the upper side of the frame portion when the caster is in the installed position;

a locking washer removably connected to the mounting shaft, the locking washer having a shaft aperture shaped and sized to receive the mounting shaft therein, the locking washer having a generally flat engagement portion defining a portion of the shaft aperture, the engagement portion being immediately adjacent to the blocking surface of the mounting shaft and positioned to engage the blocking surface of the mounting shaft, the locking washer being adapted to prevent the mounting shaft from rotating relative to the frame portion to provide directional stability of the caster wheel relative to the frame during movement of the frame; and a projection engaging the locking washer and the frame portion to prevent relative movement thereof.

2. The directional control caster assembly of claim 1 wherein the blocking surface is a first blocking surface, the mounting shaft has a second generally flat blocking surface opposite the blocking surface, and the engagement surface of the locking washer is a first engagement surface that engages the first blocking surface, and the locking washer has a second engagement surface that is opposite the first engagement surface and that engages the second blocking surface of the mounting shaft.

3. The directional control caster assembly of claim 1 wherein the mounting shaft has a keyway therein and the blocking surface defines a portion of the keyway, the locking washer has a key member protruding into the shaft aperture, the engagement portion defining a portion of the key member, the key member being shaped and sized so that the key member is removably positioned in the keyway in the mounting shaft.

4. The directional control caster assembly of claim 1 wherein the caster is a lockable and rotatable caster, the caster support and caster wheel being rotatable relative to the mounting shaft when the engagement portion of the locking washer is in engagement with the blocking surface on the mounting shaft, the caster including a locking mechanism connected to the caster support, the locking mechanism being releasably lockable to prevent the caster support from rotating relative to the mounting shaft.

5. The directional control caster assembly of claim 1, further including a bottom washer attached to the mounting shaft and positioned between the caster support and the frame portion when the caster assembly is in the installed position, the bottom washer being adapted to engage the frame member.

6. The directional control caster assembly of claim 1 wherein the locking washer is integrally connected to the projection forming an L-shaped member with the locking washer being substantially perpendicular to the projection, the projection engaging the frame portion and preventing the locking washer from rotating relative to the frame portion.

7. The directional control caster assembly of claim 1 wherein the projection is a first projection, and her comprising a second projection generally parallel to the first projection, the first and second projections positioned to engage the frame portion to prevent the locking washer from rotating relative to the frame portion.

8. The directional control caster assembly of claim 1 wherein the locking washer and projection are integrally connected and form a unitary member having a semi-cylindrical cross-sectional shape.

9. The direction control caster assembly of claim 1 wherein the locking washer has a center portion and the shaft aperture is offset from the center portion.

10. A directional control caster assembly mountable to a mobile frame of the type having a portion with opposing upper and lower sides with a caster shaft aperture therethrough, comprising:

a caster having a caster support, a caster wheel attached to the caster support, and a mounting shaft attached to the caster support and extending away from the caster support and the caster wheel, the mounting shaft being shaped and sized to extend through the aperture in the frame portion when the caster is installed with the caster support being adjacent to the lower side of the frame portion and an intermediate portion of the mounting shaft being adjacent to the upper side of the frame portion, the mounting shaft having a keyway extending along a portion of the shaft such that the keyway is adjacent to the upper side of the frame portion when the caster is in the installed position;

a locking washer removably connected to the mounting shaft, the locking washer having a shaft aperture shaped and sized to receive the mounting shaft therein, the locking washer having a key member protruding into the shaft aperture, so that the key member is removably positioned in the keyway in the mounting shaft, the locking washer being adapted to prevent the mounting shaft from rotating relative to the frame portion to provide directional stability of the caster wheel relative to the frame during movement of the frame; and a projection engaging the lock washer and the frame portion to prevent relative movement thereof.

11. The directional control caster assembly of claim 10 wherein the caster is a lockable and rotatable caster, the caster support and caster wheel being rotatable relative to the mounting shaft when the key member of the locking washer is in the keyway in the mounting shaft, the caster including a locking mechanism connected to the caster support, the locking mechanism being releasably lockable to prevent the caster support from rotating relative to the mounting shaft.

12. The directional control caster assembly of claim 10, further including a bottom washer attached to the mounting shaft and positioned between the caster support and the frame portion when the caster assembly is in the installed position, the bottom washer being adapted to engage the frame member.

13. The directional control caster assembly of claim 10 wherein the locking washer is integrally connected to the projection forming an L-shaped member with the locking washer being substantially perpendicular to the projection, the projection engaging the frame portion and preventing the locking washer from rotating relative to the frame portion.

14. The directional control caster assembly of claim 10 wherein the locking washer and projection are integrally connected and provide a unitary member having a semi-cylindrical cross-sectional shape.

15. The directional control caster assembly of claim 10 wherein the locking washer has a center portion and the shaft aperture is offset from the center portion.

16. A directional control caster assembly mountable to a frame of the type having a portion with a caster shaft aperture therein, comprising:

a swivel caster including a caster support, a wheel rotatably carried by the caster support, and a rotation member attached to the caster support, the caster support and caster wheel being rotatable relative to the rotation member;

a locking mechanism attached to the rotation member and releasably coupled to the caster support for releasably locking the caster support in a selected position relative to the rotation member to selectively restrict rotation of the caster support relative to the rotation member;

a mounting shaft connected to the rotation member, the mounting shaft being shaped and sized to extend through the caster aperture in the frame portion when the caster is installed, the mounting shaft having a keyway therein that extends along a portion of the mounting shaft that is adjacent to the frame portion such that the keyway is adjacent to the caster aperture in the frame portion when the caster assembly is in the installed position;

a locking washer removably connected to the mounting shaft, the locking washer having a second shaft aperture coaxially aligned with the mounting shaft, the locking washer having a key member extending into the second shaft aperture, the key member being removably positioned in the keyway and preventing the mounting shaft from rotating relative to the frame portion when the caster support and rotation member are rotatable relative to the mounting shaft; and a projection engaging the locking washer and the frame portion to prevent relative movement thereof.

17. The directional control caster assembly of claim 16, further including a bottom washer attached to the mounting shaft and positioned between the caster support and the frame portion when the caster assembly is in the installed position, the bottom washer being adapted to engage the frame portion.

18. The directional control caster assembly of claim 16 wherein the locking washer is integrally connected to the projection forming an L-shaped member with the locking washer being substantially perpendicular to the projection, the projection engaging the frame portion and preventing the locking washer from rotating relative to the frame portion.

19. The directional control caster assembly of claim 16 wherein the locking member has a semi-cylindrical cross-sectional shape, the locking member having end portions shaped and sized to engage the frame portion and to prevent the locking member from rotating relative to the frame portion.

20. The directional control caster assembly of claim 16 wherein the locking washer has a center and a central washer axis extending therethrough, and the shaft aperture has a central aperture axis extending therethrough, the shaft aperture being offset from the center of the locking washer such that the central washer axis is spaced apart from the central aperture axis.

* * * * *